Patented May 6, 1924.

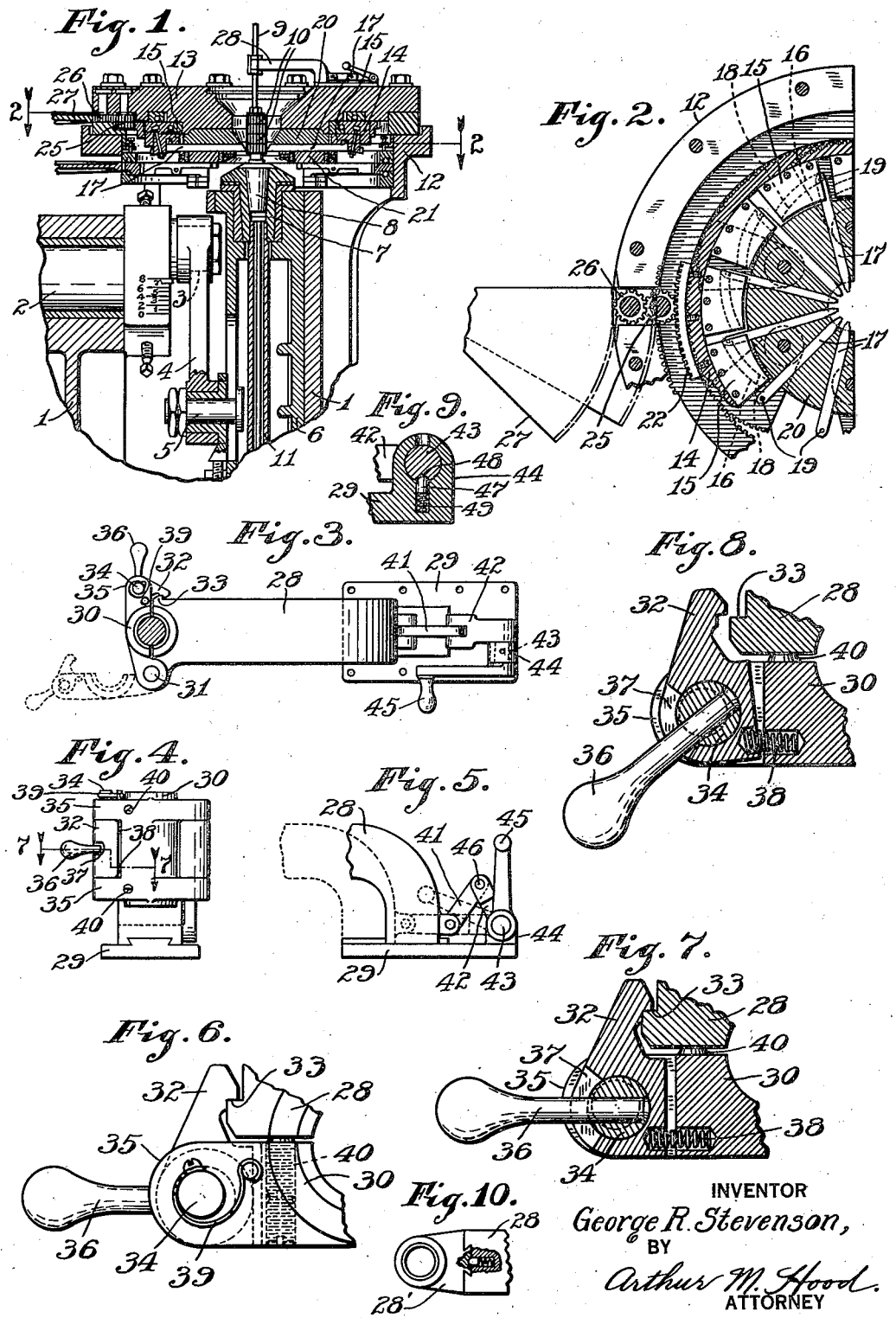

1,493,131

UNITED STATES PATENT OFFICE.

GEORGE R. STEVENSON, OF INDIANAPOLIS, INDIANA, ASSIGNOR TO STEVENSON GEAR COMPANY, OF INDIANAPOLIS, INDIANA, A CORPORATION OF INDIANA.

ARBOR SUPPORT FOR GEAR-FORMING MACHINES.

Application filed November 11, 1922. Serial No. 600,220.

*To all whom it may concern:*

Be it known that I, GEORGE R. STEVENSON, a citizen of the United States, residing at Indianapolis, in the county of Marion and State of Indiana, have invented a new and useful Arbor Support for Gear-Forming Machines, of which the following is a specification.

My invention relates to machines for producing articles of toothed or polygonal form and has particular reference to the means for supporting one end of the mandrel or arbor on which the blanks from which the articles are formed are supported.

My invention is particularly applicable to that type of machine wherein there is provided a mandrel or arbor arranged centrally of a cutting tool head which head is provided with a plurality of radially movable tools adapted to be radially moved toward the center of the head for cutting toothed articles and the like, the arbor or mandrel being adapted to be reciprocated relative to the tools during the cutting operation and being supported from one end.

It is one of the objects of my invention to provide means for supporting the free end of the arbor, which, while permitting the ready reciprocation of the same, will hold the free end of the arbor against lateral divergence.

Another object of my invention is to provide means for supporting the free end of the arbor as above, which may be readily moved out of the path of the arbor to permit the same to be withdrawn after the completion of the work.

For the purpose of disclosing my invention I have illustrated one embodiment thereof in the accompanying drawing in which Fig. 1 is a vertical sectional view of so much of a machine embodying my invention as is necessary for the purpose of illustration;

Fig. 2 is a partial sectional view on the line 2—2 of Fig. 1;

Fig. 3 is a top plan view of the upper arbor support;

Fig. 4 is an end view thereof;

Fig. 5 is a detail view showing the retracting means for the arbor support;

Fig. 6 is a detail view of the latch;

Fig. 7 is a detail sectional view of the parts illustrated in Fig. 6;

Fig. 8 is a view similar to Fig. 7 showing the latch unlatched;

Fig. 9 a fragmentary transverse section through the pivot pin of lever 45; and Fig. 10 a fragmentary horizontal section of a modification.

In the structure illustrated, upon a suitable main frame 1 is journaled a main shaft 2 provided at one end with a wrist pin 3 carrying a pitman 4 pivoted at its opposite end upon a pin 5 in turn connected to a ram 6 vertically reciprocable in suitable bearings on the frame 1. This ram 6 carries at its upper end a mandrel receiving head 7 adapted to receive the tapered shank 8 of a mandrel or arbor 9 upon which one or more blanks 10 may be assembled. This head 7 forms the upper end of a spindle 11 which is journaled in the ram.

At the upper end of the frame 1 of the machine is formed a seat 12 concentric with the axis of the spindle 11 and bolted in this seat is a cutter carrying head 13 upon which is journaled a cam carrying ring 14 suitable ball bearings being provided for this ring. The ring 14 is provided with circumferential series of cams 15 having cam surfaces 16 against which the outer end of the tools 17 abut. Each cam 15 is also provided with a retracting cam surface 18 contacted by a pin 19 carried by tools 17. Forming a part of the cutter carrying head 13 is a ring 20 in which is formed a circumferential series of tool seats which extend in the present instance, accurately radially across the ring and which seats are adapted each to receive one of the tools 17. The tools are held in place in their seats by means of a clamping ring 21 which is held in place by any suitable means actuated in such a manner that when the tools have been moved to a cutting position the clamping means will securely clamp the tools and lock the same in this position throughout the movement of the machine in cutting operation.

The tools 17 are intermittently gradually advanced toward the blank and following each cutting action are slightly retracted in order that the blank may be carried to initial position without dragging upon the tool. This movement is accomplished by a gradual advancing of the cam ring 14 and by successive retraction of said ring. In order to accomplish this result the teeth 22 of this ring mesh with a pinion 25 journaled in the head 13, which pinion in turn meshes with a second pinion 26 likewise journaled in the head and operated by a toothed segment 27 which is operated by suitable mechanism for gradually advancing the cam ring and successively retracting the ring to permit the blank to be carried back to initial position.

The blanks carried on the mandrel or arbor 9 are projected and retracted across the face of the cutting edge of the teeth 17 and to this end the ram 6 is reciprocated by means of the crank arm 4. In the machine illustrated the lower end of the mandrel as shown, is supported and secured in position in the head 7 which also holds it against lateral movement while the upper or free end extends above the head 13 and in order to hold this free end against any tendency to diverge laterally and at the same time permit a free reciprocation of the mandrel, I provide a support which is mounted upon the top of the head 13. This support comprises an arm 28 having at its front end a bearing for the mandrel 9. The rear end of the arm has a dovetailed sliding engagement with a base 29 which is secured by machine screws or otherwise on the top of the head 13. The bearing at the front end of the arm has one half thereof formed in the arm 28, while the other half is formed in a latch plate 30; this plate is pivoted at 31 to the arm and at its free end is provided with a latch 32 arranged to engage over a shoulder 33 formed on the arm and to hold the plate in closed or operative position. This latch 32 is mounted upon a hinge pin 34 which is free to rotate in the latch and is eccentrically mounted in journals 35 formed on the latch plate 30. An operating handle 36 extends through a slot 37 in the latch and is mounted in the hinge pin 34. The hinge pin is eccentrically mounted in the journals and the slot 37 permits of a lost motion between the handle 36 and the latch so that in operation after the latch snaps closed, under the influence of the spring 38 interposed between the walls of the latch and the wall of the latch plate a continued rotation of the hinge pin 34 by the handle 36 will tend to draw the shoulder of the latch 32 into engagement with the shoulder 33 of the arm 28 and thereby tend to pull the latch plate 30 up into close engagement with the end of the arm 28. The tendency of the spring 39 is to rotate the hinge pin 34 in a direction to draw the latch 32 against the shoulder 33 so that there will be no loosening tendency on the part of the hinge pin to rotate and permit the latch to become loosened. Suitable abutments 40 project from the front face of the latch plate 30 to properly space the latch plate from the front face of the arm 28 and these abutment members are preferably made adjustable so that the bearing may be adjusted for different size arbors 9.

It is apparent from the construction of the latch and latch plate that the same may be readily opened and closed, the single movement on the part of the operator of the arm 36 towards the opening position not only opens the latch 32 but a continued swinging movement of the handle 36 throws the bearing open at the same time.

In order to permit the mandrel support to be moved out of the way of the mandrel to allow the mandrel to be raised vertically and taken out of the machine after the work has been completed, the lower end of the arm 28 is slidably mounted on the base 29 and to permit rapid movement of the arm I provide a link connection which comprises a link 41 pivotally connected to the rear end of the arm 28 and connected at its opposite end to a crank arm 42 mounted upon a shaft 43 supported in a stationary journal 44 mounted upon the rear end of the base plate 29. This shaft is rotated by means of a crank 45 and the parts are so associated that when the arm 28 has been moved to its supporting position the pivot 46 between the link 41 and the arm 42 will be on the dead center and the arm rigidly held in this position. A snap pin 47 in the bearing 44 is urged into a recess 48 in the shaft 43 by a spring 49. This pin 47 seats in the recess 48 when the links 41 and 42 are straightened and holds them against buckling, thereby holding the bearing against retraction during operation of the machine. At the same time rotation of the shaft 44 by the crank arm 45 permits the arm 28 to be readily withdrawn to its retracted position.

In some instances it may be desired to disconnect the bearing for the upper end of the arbor 9 in a different manner than by opening the bearing. In such instances the arm 28 is provided with an extension 28' which carries the bearing and this extension is mounted on the end of the arm 28 by means of a dovetail joint which is tapered at its lower end so that when the parts are assembled the end 28' will be prevented from slipping downwardly. To assist in readily accurate replacement of the extension 28' a spring snap pin 28" may be mounted in head 28 to co-act with a suitable pocket formed in extension 28'.

I claim as my invention:

1. The combination with an annular tool holding head provided with a series of radially disposed cutting tools arranged to move toward and from the work for successive cuts, of a work holder support on one side of said head said support and head having relative movement, and a guide on the opposite side of said head embracing the arbor so as to brace it against all lateral displacement and readily removable to free the arbor and afford space for free axial withdrawal of the arbor and supported parts.

2. The combination with an annular tool holding head provided with a series of radially disposed cutting tools arranged to move toward and from the work for successive cuts, of an arbor support arranged on one side of said head and reciprocable relative to said head and an arbor guide arranged on the other side of said head, and adapted to be projected laterally into alignment with said arbor support, said support embracing the arbor so as to hold it against all lateral displacement.

3. The combination with an annular tool holding head provided with a series of radially disposed cutting tools arranged to move toward and away from the work for successive cuts, of an arbor support mounted on one side of said head and reciprocable relatively thereto to permit projections of the work mounted on said arbor through said head and past said tools, and an arbor support mounted upon the opposite end of said head and arranged to receive the free end of the arbor so as to brace it against all lateral displacement and readily removable to free the arbor and afford space for free axial withdrawal of the arbor and supported parts.

4. The combination with an annular tool holding head provided with a series of radially disposed cutting tools arranged to move toward and away from the work for successive cuts, of an arbor support on one side of said head and reciprocable relatively to said head to project the work carried on the arbor through said head and past the tools and an arbor guide mounted on the opposite side of said head and having a guide opening in alignment with said arbor support, said guide embracing the arbor so as to brace it against all lateral movement and being movable laterally relatively to the arbor to permit the arbor to be withdrawn from the arbor support.

5. The combination with an annular tool holding head provided with a series of radially disposed cutting tools arranged to move toward and from the work for successive cuts, of an arbor support on one side of said head reciprocable relatively thereto to project the work on said arbor through said head and past the tools and an arbor guide on the opposite side of said head having a bearing in alignment with said arbor support and means for opening said bearing to permit the lateral insertion of one end of an arbor therein.

6. The combination with an annular tool holding head provided with a series of radially disposed cutting tools arranged to move toward and from the work for successive cuts, of an arbor support arranged on one side of said head and reciprocable relatively thereto to project the work through said head and past the tools, an arbor guide mounted on the opposite side of said head said guide having a bearing aligned with the arbor support, means for opening said bearing to permit the lateral insertion and removal of an arbor therein and means for retracing said support laterally to move the same out of the path of the arbor to permit the withdrawal of the arbor from its support.

7. The combination with a tool holding head provided with cutting tools, of an arbor support arranged on one side of said head and reciprocable relatively thereto to move the work into operative relation with respect to said tools and a two part quick opening journal guide for the free end of the arbor mounted on the opposite side of said support.

8. The combination with a tool holding head provided with cutting tools, of an arbor support arranged on one side of said head and reciprocable relatively thereto to move the work into operative relation with respect to said tools, a two part guide for the opposite end of said arbor said guide including a relatively stationary member and a swinging member arranged when closed to complete the guide and a catch for holding said swinging member in closed position having means for drawing the swinging member tight by the continued operation of the handle of the catch in closing direction.

9. The combination with a tool holding head provided with cutting tools, of an arbor support mounted on one side of said head and reciprocable relatively thereto to move the work in operative engagement with said tools, a guide for the free end of the arbor comprising a supporting arm having a portion of the guide formed therein, an arm hingedly mounted on the end of said supporting arm having a portion of the guide therein and a latch for holding the free end of said swinging arm closed operated by a handle, means for causing said latch to draw the swinging arm into closing position by continued movement of the handle in the closing direction of the latch.

In witness whereof, I, GEORGE R. STEVENSON, have hereunto set my hand.

GEORGE R. STEVENSON.